INVENTORS
PAUL J. STAEBLER
JAMES L. CRAWFORD
CHARLES N. FANGMAN
ROBERT R. MCCUTCHEN

BY

ATTORNEYS

May 27, 1969  P. J. STAEBLER ET AL  3,447,012
ROTOR CONSTRUCTION
Filed April 10, 1968  Sheet 3 of 3

INVENTORS
PAUL J. STAEBLER
JAMES L. CRAWFORD
CHARLES N. FANGMAN
ROBERT R. MCCUTCHEN
BY
Fryer, Tjensvold, Feix, Phillips & Lempio
ATTORNEYS

United States Patent Office 3,447,012
Patented May 27, 1969

---

3,447,012
ROTOR CONSTRUCTION
Paul J. Staebler, Peoria, James L. Crawford, Chillicothe, Charles N. Fangman, Peoria, and Robert R. McCutchen, East Peoria, Ill., assignors to Caterpillar Tractor Co., Peoria, Ill., a corporation of California
Filed Apr. 10, 1968, Ser. No. 720,281
Int. Cl. H02k 1/22, 1/28
U.S. Cl. 310—262    2 Claims

ABSTRACT OF THE DISCLOSURE

In a high speed alternator, an improved rotor construction having lower eddy current losses than other solid core rotor construction includes a plurality of thin laminated pole caps interlocked on the tips of the poles or lobes milled in the rotor. Supporting this rotor on nonmagnetic stub shafts further improve the design, as does the addition of circular plates contiguous to the poles or lobes to reduce air drag losses; i.e., windage losses.

Cross-reference to related patent

U.S. Patent No. 3,293,469, issued to Crawford et al., discloses a high speed alternator employing a solid rotor design, and this invention relates to an improvement in the rotor construction for such an alternator.

Background of the invention

A high speed alternator, i.e., one operating at speeds in the range of 12,000 r.p.m. or greater, and at high output requires a special rotor construction to withstand the forces acting on the rotor. Since standard laminated rotor constructions are likely to disintegrate under these forces, they are unsuitable for a high speed alternator.

Fabricating the rotor from a solid core of magnetic material, by milling or otherwise forming poles and lobes in the core, can provide a rotor capable of withstanding the forces acting on it during high speed operations and at high outputs. However, such a solid core rotor design has certain inherent disadvantages.

One serious disadvantage of a solid core rotor construction is the generation of heat as a result of the strong eddy currents flowing through the solid rotor, especially at the pole or lobe peripheral faces. By increasing the clearance between the rotor tips and the stator laminations a reduction in the acute heating at the pole tips can be accomplished, but it also reduces the efficiency of the machine, requiring higher excitation currents.

If the solid core rotor is supported for rotation on shafts of magnetic material, i.e., the same material as the core, the supporting bearings are in very strong magnetic fields. Thus, during rotation of the rotor, eddy currents will be generated in the bearing causing excess bearing heating.

Another problem with solid core rotor design is the loss of horsepower caused by the drag of the distinct poles or lobes protruding from the rotor as they rotate in the surrounding air. These losses are often referred to as windage losses and cause heating of the rotor.

Coolants, circulated through the support shafts, its bearings, and sometimes through the rotor itself, will dissipate the heat, but complicates the design and greatly increases the cost of such an alternator.

Summary of the invention

By incorporating the features of the present invention in solid core rotor design, the above problems or complicated solutions therefor, can be reduced or eliminated.

Basically, an improved solid core rotor design is effected by incorporating on the peripheral pole or lobe tips an interlocking laminated pole cap of a relatively thin radial dimension which is composed of a plurality of thin laminates of a material of high magnetic permeability. Also, by supporting the solid core rotor with the laminated pole caps on stub shaft members composed of a non-magnetic material, bearing heating is sharply reduced. Circular, washer-like, windage plates of a non-magnetic material mounted contiguous to the sides of the poles or lobes will further improve efficiency by reducing windage losses.

Brief description of the drawings

This invention will be more easily understood from the following detailed description, in conjunction with the attached drawings, wherein.

Description of a preferred embodiment

Figure 1:
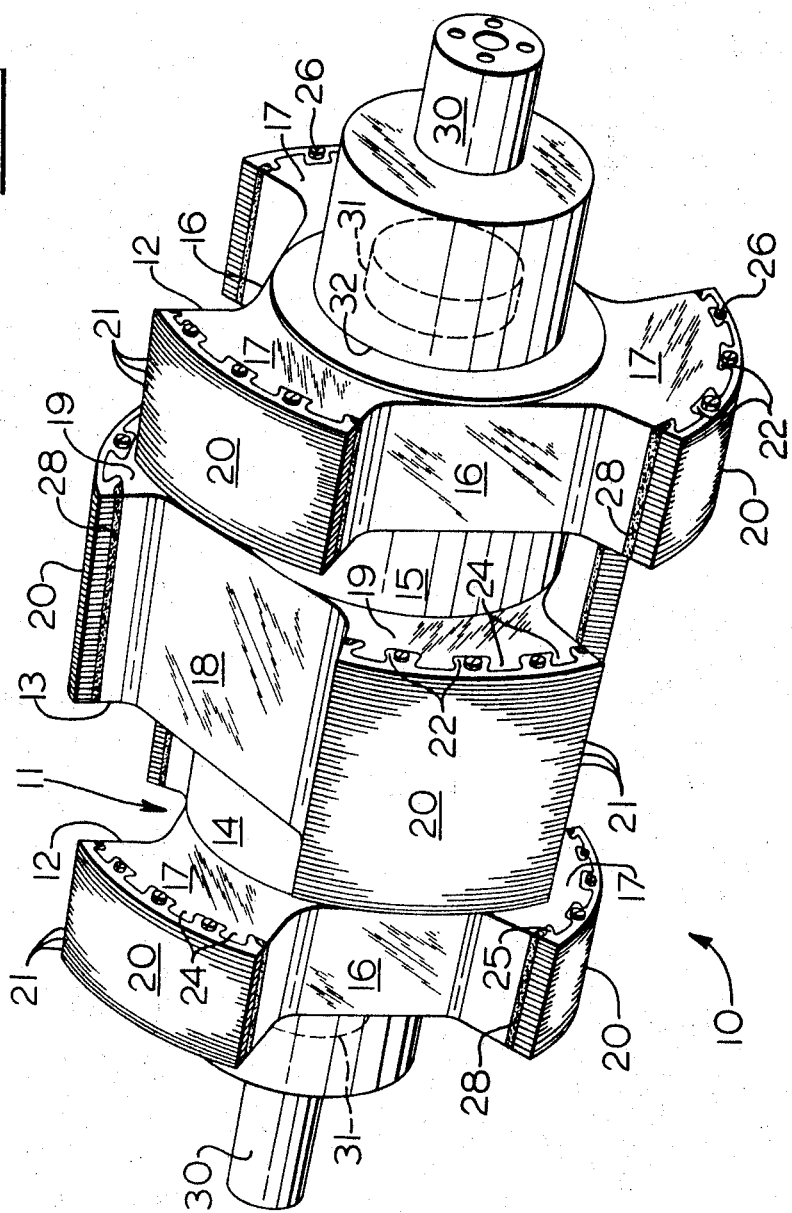
FIGURE 1 is a perspective of a solid core rotor design employing the laminated pole caps.
Figure 2:
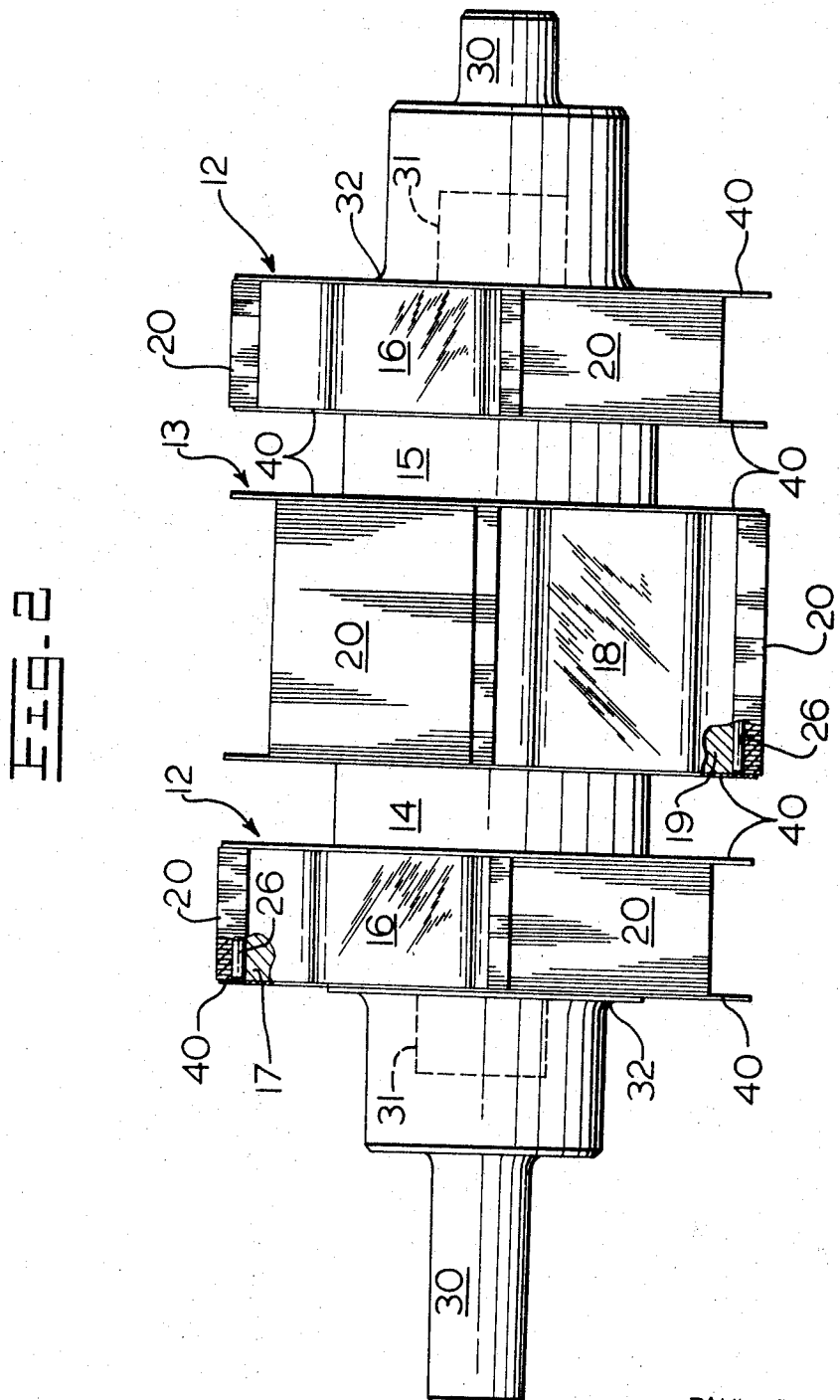
FIGURE 2 is an elevation of the rotor shown in FIGURE 1 with windage plates incorporated thereon and parts broken away.

FIGURES 1 and 2 show a rotor 10, of a solid core design, which is illustrated as a six pole rotor. The core 11, which is a high strength material forging having good magnetic properties, such as low carbon steel, can be milled from a cylinder or formed with three separate pole or lobe circular sections, two end sections 12 and a center section 13, by grooving or cutting the cylindrical core in areas 14 an 15. Normally, the center section is twice the width of the end section, in such a design.

Distinct poles or lobes are then formed in the end sections and the center section generally by removing portions of the circular pole or lobe section. Notches 16 are provided in the end sections to form three distinct end poles or lobes 17 in each end section. The lobes or poles of the two end sections are aligned, as can be seen in FIGURE 1. Similarly, notches 18 in the center section of the core divide it into three distinct center poles or lobes 19, which are angularly disposed from the aligned end poles 17, by an angle of 60° in a six pole design. It will be recognized by those skilled in the art that undesirable tooth ripple in the alternator output can be eliminated by skewing of the stator slots where no skew is provided by the rotor construction.

Figure 3:
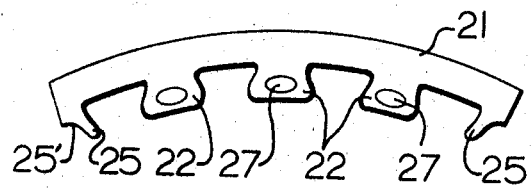
FIGURE 3 is an elevation of a lamination used to construct the pole caps.

On the peripheral tip of each pole or lobe 17 and 19 is a laminate pole cap 20 which interlocks with the tip and is fastened securely thereto. Each of these caps are composed of a plurality of thin metal laminations 21, each of which are constructed to interlock with the tip. A metal with good magnetic permeability is used to make the individual laminate blanks, one of which is shown in FIGURE 3, which are then assembled on the tips to form the caps.

In a rotor having a diameter of about 13 inches and an angular velocity of 12,000 r.p.m. or greater, retaining the laminated caps on the rotor tips is a real problem. Disintegration of the alternator will likely occur if one of the caps loosens or flies free from its associated tip; thus, secure, permanent attachment of the caps is necessary.

In the instant invention, a novel, inexpensive technique is employed to fasten the laminated caps securely and permanently to the pole tips. Each laminate blank 21 is formed with a plurality of tabs 22 of a dovetail configuration which are received in axial-aligned, cooperating grooves 23 milled in each pole tip, which forms ribs 24 of a reverse configuration in the pole tips. The outmost tab 25 on each blank is faced so as to be flush with the edge of the poles when assembled thereon and is further provided with a relieved section 25' which serves to allow a weld root area between the lamination and the edge of the pole tip.

Preferably, the dovetail interlock is loose enough so a stack of the blanks can be conveniently assembled on each pole tip, as shown in FIGURE 1. Fastening the caps can then be accomplished by driving split tapered pins 26 in the elongated holes 27 of each blank, which are aligned when assembled on the pole tips. These pins will spread tabs 22 to tightly lock them in grooves 23 and on ribs 24.

Figure 4:
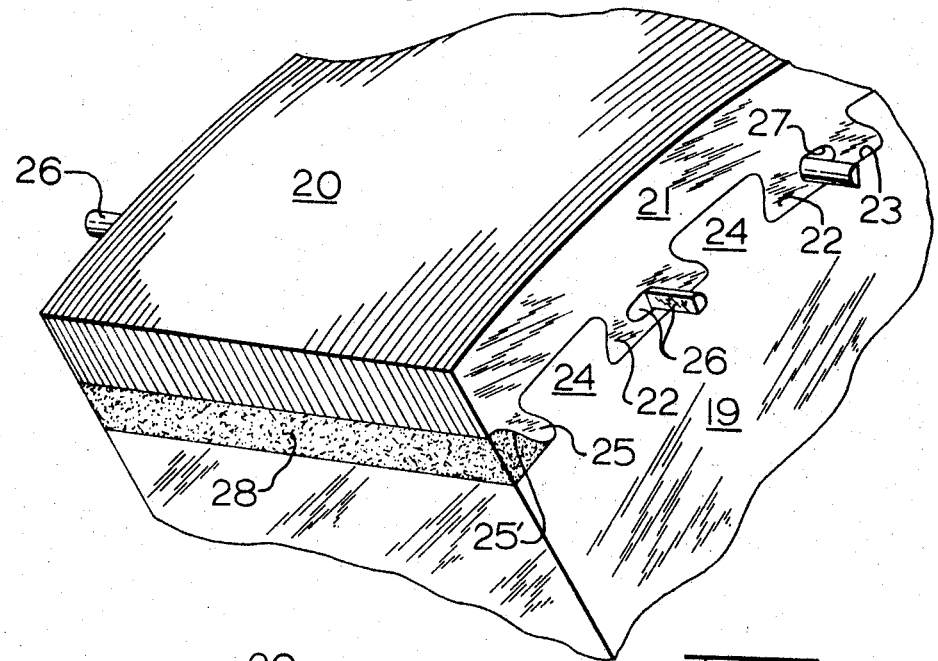
FIGURE 4 is an enlarged portion of the pole tip of the center lobe portion of the rotor.

By driving the tapered pins into the aligned elongated holes in the blanks from opposite sides of each pole when assembled thereon, a swaging action takes place, securely fastening each individual laminate in the cap to the pole tip. After pins 26 are in place, the outer edge of tabs 25 facing against the edge of the respective poles are welded with filet weld 28 in the area of the relieved section 25' to permanently secure the laminated cap on the pole tip. See FIGURE 4 showing the above features in greater detail.

Each laminate in the cap is of thin radial thickness or dimension to keep the weight of the cap down since even with the swage locking and welded edges these caps, if heavy, would pull free at the high angular speeds involved.

The above-described rotor, when supported on non-magnetic stub shaft members 30 piloted to the opposite ends of the core on pins 31 and attached by filet welds 32, provides a solid core rotor design in which eddy currents are reduced sufficiently that heating at the pole tips and in the bearings is not a problem, even when employing minimum clearances between the pole tips and stator lamination.

Figure 5:
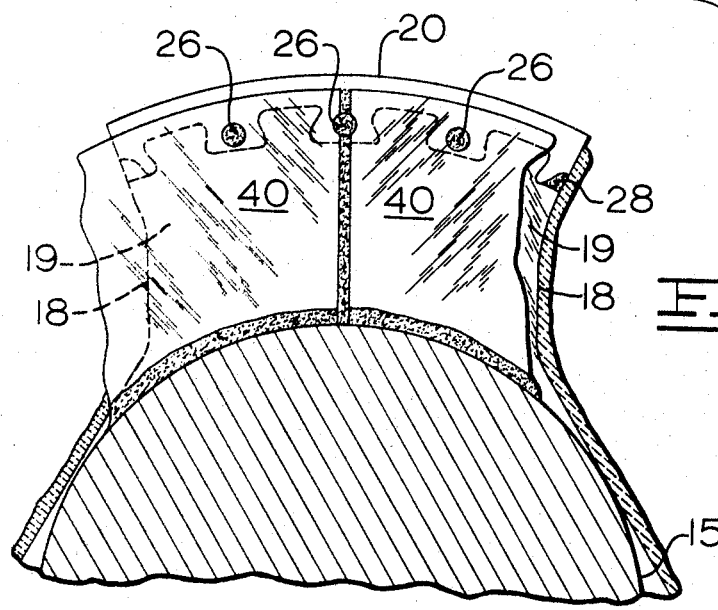
FIGURE 5 is a radial section through the rotor with parts broken away showing the attachment of the circular windage plates to the poles or lobes.

In FIGURE 2, circular windage plates 40 are attached to the sides of the pole sections 12 and 13. At the ends of the core, these plates can be washer-like plates of a non-magnetic material. At other locations, they must be assembled from sections, and FIGURE 5 shows how these plates are secured by welding at the points of contact with core areas 14 or 15 and notch areas 16 or 18, at the end of locking pins 26 and at the seam between sections of the plate. The windage plates are not welded to the laminations at the peripheral surface of the pole caps.

Attaching the pole caps by a technique, other than described above, is possible, but does not provide the foolproof quality joint obtained by the combination mechanical keying and welding technique. Further, other techniques are often considerably more expensive.

A coolant system for the alternator can be employed with the novel rotor construction, if desired, for special applications, and conventional coolant systems can be employed.

In a rotor having about a 13 inch diameter, the maximum radial dimensions of the individual laminates were in the range of 0.84 inch. This radial thickness is sufficient, since, at the high frequencies involved, penetration of eddy currents in the pole tip is not appreciable. Penetration follows the familiar characteristic in induction heating where penetration decreases as frequency increases. Individual laminate blanks for this rotor were stamped from 0.014 inch sheet having a surface insulation.

What is claimed is:
1. An improved rotor construction for a high speed alternator comprising
   a unitary cylindrical core means of magnetic material having at least three circular pole sections with equally spaced individual poles formed in each of said sections, said individual poles having a plurality of grooves in their arcuate peripheral surfaces;
   nonmagnetic shaft support means rigidly connected to the opposite ends of said cylindrical core means for rotating it in an alternator;
   a plurality of thin arcuate pole caps each formed of a stack of identical thin laminations of a material of high magnetic permeability and each having a plurality of projecting dovetail tabs with an aperture centrally located in each tab, one of said arcuate pole caps assembled on each pole tip with said dovetail tabs received within the cooperating grooves formed in its associated tip,
   swaging means received in said apertures of said tabs to expand them to tightly fit their associated groove so the cap is tightly secured across the top of the pole; and
   welded seams perpendicular to the laminations along opposite sides of each pole cap physically joining it to its associated pole tip.

2. The improved rotor as defined in claim 1, wherein circular windage plates are attached contiguous to the pole sections to reduce the atmospheric drag of the individual poles formed therein.

References Cited
UNITED STATES PATENTS

| | | | |
|---|---|---|---|
| 464,216 | 12/1891 | Day | 310—216 XR |
| 571,462 | 11/1896 | Geisenhoner | 310—218 |
| 582,494 | 5/1897 | Westinghouse | 310—216 |
| 596,152 | 12/1897 | Geisenhoner | 310—218 |
| 606,863 | 7/1898 | Gutmann | 310—168 |
| 902,588 | 11/1908 | Lord | 310—269 |
| 1,726,042 | 6/1927 | Reis. | |
| 1,991,092 | 2/1935 | Hathaway | 310—218 |
| 2,629,061 | 2/1953 | Swarthout. | |
| 3,157,806 | 11/1964 | Wiedemann | 310—262 XR |
| 3,258,620 | 6/1966 | Imanuel | 310—269 |

M. O. BUDD, *Primary Examiner.*

MILTON O. HIRSHFIELD, *Assistant Examiner.*

U.S. Cl. X.R.

310—218